United States Patent
Posch et al.

(10) Patent No.: US 11,776,058 B2
(45) Date of Patent: *Oct. 3, 2023

(54) TRANSACTION EFFECTS

(71) Applicant: Addepar, Inc., Mountain View, CA (US)

(72) Inventors: Daniel Posch, Mountain View, CA (US); Jason Mirra, Mountain View, CA (US); Miroslav Kukla, Mountain View, CA (US)

(73) Assignee: Addepar, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,646

(22) Filed: Sep. 10, 2021

(65) Prior Publication Data

US 2021/0407011 A1    Dec. 30, 2021

Related U.S. Application Data

(63) Continuation of application No. 15/996,333, filed on Jun. 1, 2018, now Pat. No. 11,120,502, which is a (Continued)

(51) Int. Cl.
    *G06Q 40/06*      (2012.01)
    *G06Q 40/02*      (2023.01)

(52) U.S. Cl.
    CPC ............ *G06Q 40/06* (2013.01); *G06Q 40/02* (2013.01)

(58) Field of Classification Search
    CPC .............................. G06Q 40/06; G06Q 40/02
    See application file for complete search history.

(56) References Cited

U.S. PATENT DOCUMENTS 6,865,567 B1   3/2005   Oommen et al.
7,046,248 B1   5/2006   Perttunen
(Continued)

FOREIGN PATENT DOCUMENTS

AU   200135163   4/2001
CA   2817652     12/2013
(Continued)

OTHER PUBLICATIONS

Kleppmann, Martin: Accounting for Computer Scientist, Mar. 2011, pp. 1-9 (Year: 2011).*

(Continued)

*Primary Examiner* — Bijendra K Shrestha
(74) *Attorney, Agent, or Firm* — Knobbe, Martens, Olson & Bear, LLP

(57) ABSTRACT

A method comprising creating and storing, in computer memory, a financial graph having nodes and edges, wherein the nodes include first nodes representing assets and second nodes representing any one or more of accounts in which one or more of the assets are held, individuals who own one or more of the assets, or legal entities who own one or more of the assets; obtaining, from an asset custodian data source, asset transaction data associated with one or more of the assets represented by the first nodes of the financial graph; transforming the asset transaction data into one or more stored transaction objects, wherein each transaction object is associated with a plurality of transaction effect objects; wherein each of the plurality of transaction effect objects is associated with a particular edge in the financial graph and represents one of a credit to an account type associated with the particular edge and a debit from an account type associated with the particular edge.

20 Claims, 7 Drawing Sheets

Related U.S. Application Data continuation of application No. 14/819,287, filed on Aug. 5, 2015, now Pat. No. 10,013,717, which is a continuation of application No. 13/918,381, filed on Jun. 14, 2013, now Pat. No. 9,105,064, which is a continuation of application No. 13/714,319, filed on Dec. 13, 2012, now Pat. No. 9,105,062.

(56) References Cited

U.S. PATENT DOCUMENTS

| | | | |
|---|---|---|---|
| 7,299,223 B2 | 11/2007 | Namait et al. | |
| 7,395,270 B2 | 7/2008 | Lim et al. | |
| 7,533,057 B2 | 5/2009 | Whipple et al. | |
| 7,533,118 B2 | 5/2009 | Chaudri | |
| 7,644,088 B2 | 1/2010 | Fawcett et al. | |
| 7,769,682 B2 * | 8/2010 | Moudgal | G06Q 40/025 705/38 |
| 7,827,082 B1 * | 11/2010 | Shanmugam | G06Q 40/02 705/36 R |
| 7,836,394 B2 | 11/2010 | Linder | |
| 7,873,557 B2 | 1/2011 | Guidotti et al. | |
| 7,949,937 B2 | 5/2011 | Wu | |
| 7,966,234 B1 * | 6/2011 | Merves | G06Q 40/00 705/36 R |
| 7,996,290 B2 * | 8/2011 | Dweck | G06Q 40/00 705/35 |
| 8,117,187 B2 | 2/2012 | Mostl | |
| 8,249,962 B1 | 8/2012 | Stephens et al. | |
| 8,271,519 B2 | 9/2012 | Young | |
| 8,306,891 B1 * | 11/2012 | Findlay, III | G06Q 40/06 705/37 |
| 8,458,764 B2 | 6/2013 | Karjoth et al. | |
| 8,819,763 B1 | 8/2014 | Cheung et al. | |
| 9,015,073 B2 | 4/2015 | Mirra et al. | |
| 9,087,361 B2 | 7/2015 | Mirra et al. | |
| 9,105,062 B2 | 8/2015 | Posch et al. | |
| 9,105,064 B2 | 8/2015 | Posch et al. | |
| 9,218,502 B1 | 12/2015 | Doermann et al. | |
| 9,244,899 B1 | 1/2016 | Greenbaum | |
| 9,424,333 B1 | 8/2016 | Bisignani et al. | |
| 9,485,259 B1 | 11/2016 | Doermann et al. | |
| 9,760,544 B2 | 9/2017 | Mirra et al. | |
| 9,916,297 B1 | 3/2018 | Greenbaum | |
| 9,935,983 B1 | 4/2018 | Doermann et al. | |
| 10,013,717 B2 | 7/2018 | Posch et al. | |
| 10,331,778 B1 | 6/2019 | Greenbaum | |
| 10,372,807 B1 | 8/2019 | Greenbaul et al. | |
| 10,430,498 B2 | 10/2019 | Mirra et al. | |
| 10,565,298 B1 | 2/2020 | Bisignani et al. | |
| 10,686,840 B1 | 6/2020 | Doermann et al. | |
| 10,732,810 B1 | 8/2020 | Cohen et al. | |
| 10,956,665 B1 | 3/2021 | Greenbaum et al. | |
| 11,055,478 B1 | 7/2021 | Bisignani et al. | |
| 11,120,502 B2 | 9/2021 | Posch et al. | |
| 11,163,945 B1 | 11/2021 | Greenbaum | |
| 11,501,374 B1 | 11/2022 | Cohen et al. | |
| 2002/0042764 A1 | 4/2002 | Gardner et al. | |
| 2003/0174165 A1 | 9/2003 | Barney | |
| 2004/0236655 A1 | 11/2004 | Scumniotales et al. | |
| 2005/0187852 A1 | 8/2005 | Hwang | |
| 2005/0222929 A1 * | 10/2005 | Steier | G06Q 40/00 705/35 |
| 2005/0262047 A1 | 11/2005 | Wu | |
| 2006/0085370 A1 * | 4/2006 | Groat | G06F 16/9024 |
| 2006/0146719 A1 | 7/2006 | Sobek et al. | |
| 2007/0010071 A1 | 1/2007 | Cuscovitch et al. | |
| 2008/0139191 A1 | 6/2008 | Melnyk et al. | |
| 2008/0270316 A1 | 10/2008 | Guidotti et al. | |
| 2009/0164387 A1 | 6/2009 | Armstrong et al. | |
| 2009/0249359 A1 | 10/2009 | Caunter et al. | |
| 2010/0100802 A1 | 4/2010 | Delaporte | |
| 2011/0283242 A1 | 11/2011 | Chew et al. | |
| 2011/0302221 A1 | 12/2011 | Tobin et al. | |
| 2012/0089432 A1 | 4/2012 | Podgurny | |
| 2012/0136804 A1 | 5/2012 | Lucia et al. | |
| 2012/0182882 A1 | 7/2012 | Chrapko et al. | |
| 2012/0331134 A1 * | 12/2012 | Lynn | G06F 16/2458 709/224 |
| 2013/0073939 A1 | 3/2013 | Honsowetz | |
| 2013/0073940 A1 | 3/2013 | Honsowetz | |
| 2013/0212505 A1 * | 8/2013 | Herold | G06F 3/04842 715/765 |
| 2014/0250375 A1 | 9/2014 | Malik | |
| 2015/0026075 A1 | 1/2015 | Mondri et al. | |

FOREIGN PATENT DOCUMENTS

| | | | |
|---|---|---|---|
| CA | 2817660 | 12/2013 | |
| CA | 2817660 A1 * | 12/2013 | G06F 3/048 |
| CA | 2834265 | 6/2014 | |
| EP | 1862955 | 5/2007 | |
| EP | 2439691 | 4/2012 | |
| EP | 2672446 | 12/2013 | |
| EP | 2672447 | 12/2013 | |
| EP | 2743881 | 6/2014 | |
| HK | 1193898 | 10/2014 | |
| JP | 2002197277 | 7/2002 | |
| SG | 195517 | 12/2013 | |
| SG | 195518 | 4/2015 | |
| WO | WO 2005/036364 | 4/2005 | |
| WO | WO 2008/017044 | 2/2008 | |
| WO | WO-2008017044 A1 * | 2/2008 | G06F 8/34 |

OTHER PUBLICATIONS

Kleppmann, Martin: Accounting for Computer Scientists, Mar. 7, 2011, Blog, pp. 1-8. (Year: 2011).*

Norheim, Hans O.: Graphs and Graph Algorithms in T-SQL, May 22, 2010, pp. 1-10. (Year: 2010).*

Henskens et al.: Graph-based Optimistic Transaction Management, Jul.-Aug. 2007, Journal of Object Technology, ETH Zurich, vol. 6, No. 6, pp. 1-18. (Year: 2007).*

U.S. Pat. No. 9,105,062, Transaction Effects, Aug. 11, 2015.

U.S. Pat. No. 9,105,064, Transaction Effects, Aug. 11, 2015.

U.S. Pat. No. 10,013,717 Transaction Effects, Jul. 3, 2018.

U.S. Pat. No. 11,120,502, Transaction Effects, Sep. 14, 2021.

Hans Olav Norheim, Graphs and Graph Algorithms in T-SQL, May 22, 2010, retrieved from http://hansolav.net/sql/graphs.html, 10 pages.

Mastercard, "Common Data Formats Overview—XML Data Format", Jul. 13, 2012, 32 pages.

Sahner et al., "Performance and Reliability Analysis Using Directed Acyclic Graphs", IEEE Transactions on Software Engineering, vol. SE-13, No. 10, Oct. 1987, pp. 1105-1114.

Wagner et al., Assessing the Vulnerability of Supply Chain Using Graph Theory, 2010, International Journal of Production Economics 126, pp. 121-129.

Yang et al., Incremental Mining of Across-Stream Sequential Patterns in Multiple Data Streams, Mar. 2011, Journal of Computers, vol. 6, No. 3, pp. 449-457.

European Patent Office, "Search Report" in application No. 13197286. 1, dated Mar. 14, 2014, 5 pages.

Examination Report in Canadian Patent Application No. 2834265 dated Oct. 21, 2019, 14 pages.

Examination Report in Canadian Patent Application No. 2834265 dated Feb. 11, 2021, 10 pages.

Chakrabarti, D., & Faloustsos, C. (2006). Graph mining. ACM Computing Surveys, 38(1), 2. doi:http://doi.acm.org.10.1145/1132952. 1132954 retrieved on Feb. 6, 2015.

European Patent Office, "Extended Search Report" in application No. 13170954.5, dated Jan. 21, 2014, 6 pages.

European Patent Office, "Search Report" in application No. 13170952. 9, dated Jan. 21, 2014, 6 pages.

Singapore, "Search and Examination Report" in application No. 201304379-9, dated Jan. 23, 2014.

Singapore, "Search and Examination Report" in application No. 201304378-1, dated Jul. 3, 2014.

(56) References Cited

OTHER PUBLICATIONS

Office Action in Canadian Patent Application No. 2,834,265, dated Feb. 2, 2023, 6 pages.

* cited by examiner

```
public static final Tx buy = new Tx("buy").properties(Tx.Property.HasPrice)
    .createOn(TxCreationContext.SHARE_BASED)
    .node("o", Nd.account).node("co", Nd.account)
    .node("c", Nd.cash).node("sec", Nd.sharebased)
    .effects(
        e().owner("co").security("c").credit(Acct.Asset.tangible),
        e().owner("o").security("sec").debit(Acct.Asset.tangible),
        e().owner("o").security("sec").debit(Acct.Expense.fee).optional());
```

TRANSACTION EFFECTS

CROSS-REFERENCE TO RELATED APPLICATIONS

This application is a continuation of U.S. patent application Ser. No. 15/996,333, filed Jun. 1, 2018, which is a continuation of U.S. patent application Ser. No. 14/819,287, filed Aug. 5, 2015, and titled "Transaction Effects," which is a continuation of U.S. patent application Ser. No. 13/918,381, filed Jun. 14, 2013, and titled "Transaction Effects," which is a continuation of U.S. patent application Ser. No. 13/714,319, filed Dec. 13, 2012, and titled "Transaction Effects." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to data processing, particularly techniques for representing, storing, and analyzing financial transaction data in a computer-implemented financial analysis system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Financial advisors, such as registered investment advisors (RIAs) and their firms, institutional investors, and others often analyze financial data associated with client, customer, or personal assets held by various different financial institutions. In order to analyze the potentially vast number of financial transactions that may occur with the assets, a computer-implemented financial analysis system may be utilized for purposes of analysis and reporting on transaction data obtained from those financial institutions. For example, transaction data obtained from a financial institution may record any number of financial transactions affecting a particular set of assets such as, for example, stock purchases, stock splits, foreign exchange transactions, company mergers, fund contributions, or any other recorded financial transaction.

Typically, transaction data obtained from a financial institution is in a table or other similar format, with each row in the table representing a particular transaction event and labeled with a transaction type identifier from a large set of possible transaction types defined by the particular institution. For example, a foreign currency exchange transaction recorded by one financial institution may be represented by multiple rows in a table: one row corresponding to an amount of one currency leaving an account and labeled with a "foreign exchange out" identifier, and a second row corresponding amount of a second currency being deposited into an account and labeled with a "foreign exchange in" identifier. As illustrated by the foregoing example, transactions that are conceptually a single act may be represented by particular financial institutions in multiple rows identified by different transaction type identifiers. Further, different financial institutions may represent particular financial transactions using varying numbers of rows and using inconsistent identifiers.

The representation of financial transaction data is this manner presents a number of challenges to efficiently representing, storing, analyzing, and implementing other financial performance calculations on the data in a computer-implemented financial analysis system. For example, financial performance calculations defined in terms of the transaction types presented by the financial institutions may result in burdensome refactoring of the computer program code that specifies operation of the system each time new transaction types are added or modified by a particular financial institution. Further, cumbersome and error-prone reconciliation logic is often required in order to properly account for the varying transaction representations across financial institutions.

SUMMARY

The appended claims may serve as a summary of the invention.

BRIEF DESCRIPTION OF THE DRAWINGS

In the drawings:

FIG. 3 illustrates an example code segment implementing generation of a transaction object and associated transaction effect objects.

DETAILED DESCRIPTION OF EXAMPLE EMBODIMENTS

Figure 1A:
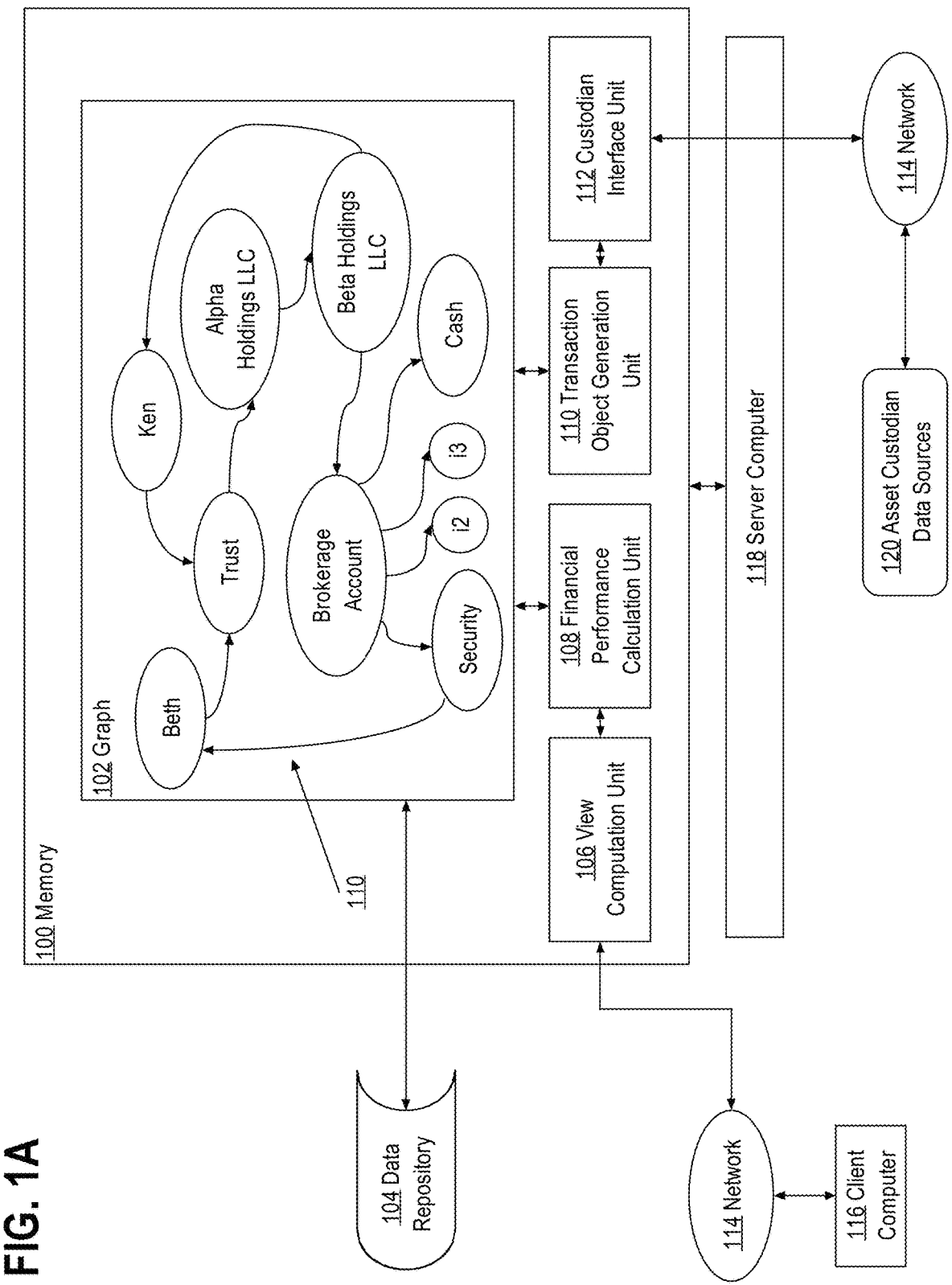
FIG. 1A illustrates a computer system that may be used to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

In an embodiment, a method comprises creating and storing, in computer memory, a financial graph having nodes and edges, wherein the nodes include first nodes representing assets and second nodes representing any one or more of accounts in which one or more of the assets are held, individuals who own one or more of the assets, or legal entities who own one or more of the assets; obtaining, from an asset custodian data source, asset transaction data associated with one or more of the assets represented by the first nodes of the financial graph; transforming the asset transaction data into one or more stored transaction objects, wherein each transaction object comprises a plurality of transaction effect objects; wherein each of the plurality of transaction effects is associated with a particular edge in the financial graph and represents one of a credit to an account type associated with the particular edge and a debit from an account type associated with the particular edge. In one feature, each of the plurality of transaction effects identifies a particular first node and a particular second node of the financial graph.

In another feature, each of the plurality of transaction effects further identifies one or more of a number of units by which an associated financial position is modified, a value representing a magnitude of an income or an expense occurring relative to the associated financial position.

In an embodiment, transforming the asset transaction data into one or more stored transaction objects comprises: identifying a transaction type that one or more transaction entries in the asset transaction data represent; creating a single particular transaction object that corresponds to the transaction type.

In one feature, the single particular transaction object comprises a particular plurality of transaction effects that collectively represent a plurality of changes to one or more accounts.

In another feature, obtaining asset transaction data further comprises transforming the asset transaction data into a canonicalized transaction data representation based on a canonical transaction data representation format.

In an embodiment, the method further comprises retrieving one or more particular transaction effects associated with one or more edges in the financial graph; generating one or more financial performance calculation values based on the particular transaction effects; causing displaying one or more of the generated values.

In another feature, an edge represents one or more of asset ownership, a liability, or equity ownership.

In another feature, the asset transaction data is represented as tabular data comprising one or more rows identifying one or more financial transaction events. In another feature, the account type is one of an assets account, a liabilities account, an equity account, an income account, an expenses account, a sub-account of another account.

2.0 Structural and Functional Overview

In one embodiment, a computer-implemented financial analysis system provides for the representation, storage, and analysis of asset transaction data as part of a financial graph managed in computer memory. In this context, a financial graph refers to a graph having any number of nodes and edges and that represents a set of investment holdings based on client or customer asset transaction data received from one or more financial institution data sources, referred to herein as asset custodian data sources. In an embodiment, the nodes of the financial graph may represent assets, accounts in which one or more of the assets are held, individuals who own one or more of the assets, or legal entities who own one or more of the assets. In an embodiment, the edges of the financial graph may represent relationships between nodes such as asset ownership relationships, liability relationships, equity ownership relationships, and commitments for the purchase or sale of various assets.

In an embodiment, asset transaction data received from asset custodian data sources is transformed into one or more programmatic objects, referred to herein as transaction objects, that may be stored and further manipulated. A transaction object generally represents a financial transaction identified in obtained asset transaction data and involving one or more nodes in a financial graph. For example, transaction objects may represent various financial transactions recorded by a financial institution such as foreign exchange transactions, purchases or sales of stock, company mergers, or any other financial transaction.

In an embodiment, a transaction object is associated with a plurality of transaction effect objects. A transaction effect object generally represents a modification to an accounting account associated with a particular edge in the financial graph. In this context, an accounting account refers to one of the accounts, or a sub-account thereof, contained in the basic accounting equation: Assets=Liabilities+Equity+(Income−Expenses). In an embodiment, the representation of asset transaction data in this manner is used to more efficiently analyze asset transaction data obtained from a wide-variety custodian data sources, as further described herein.

FIG. 1 illustrates a computer system that may be used to implement an embodiment. In an embodiment, computer memory 100 stores a graph 102 that represents a particular set of investment holdings. In an embodiment, client or customer investment data is obtained from one or more asset custodian data sources 120, such as brokerages, banks, or other financial institutions, and transformed into graph data prior to storage into a data repository for use by the system, as further described herein.

Memory 100 forms part of a computer system having a processor, mass storage, input-output devices, and other elements that are omitted in FIG. 1 for purposes of clarity. View computation unit 106 may be configured for rendering and communicating financial performance calculations and other reports to a display unit of client computer 116. In an embodiment, graph 102, view computation unit 106, financial performance calculation unit 108, and transaction object generation unit 110 are implemented using object-oriented programming techniques in which nodes of the graph are represented using programmatic objects. For example, JAVA® may be used. However, in other embodiments, the graph 102, view computation unit 106, financial performance calculation unit 108, and transaction object generation unit 110, described further herein, may be implemented within server computer 118 using special-purpose logic, firmware, or other computing elements so that elements 100, 110, 106, 108, 110, and 112 form a special-purpose computer capable of performing the processes that are described herein.

In an embodiment, the foregoing elements of FIG. 1 form part of a server computer 118 that is coupled directly or indirectly through one or more computer networks, represented by network 114, to a client computer 116. Network 114 broadly represents and may comprise one or more LAN, WAN, or internetwork links and may comprise the public internet through the use of appropriate protocols for ensuring data security, user authentication and user authorization.

Client computer 116 may comprise an individual client computing device such as personal computer, workstation, laptop, netbook, tablet computer, or smartphone that is coupled through network 114 to the other elements of FIG. 1. Client computer 116 typically hosts an internet browser program which, in an embodiment, is configured with virtual machine program execution capability. For example, client computer 116 may host a JAVA virtual machine and may receive and execute one or more JAVA files that cause the browser to display a graphical user interface that receives data from and facilitates interaction with the server computer 118 and view computation unit 106.

Custodian interface unit 112 is coupled directly or indirectly through network 114 to one or more asset custodian data sources 120. Typically there are multiple asset custodian data sources 120 located at multiple different asset custodians such as banks, brokerages, mutual fund companies, or other financial institutions, and element 120 in FIG. 1 broadly represents any number of such data sources and custodians. In an embodiment, asset custodian data sources 120 serve as an authoritative source of data about accounts and financial transactions involving assets associated with individuals or other entities represented in data repository 104 and graph 102. Custodian interface unit 112 is configured to obtain account and asset transaction data periodically or through live data feeds from asset custodian data sources 120. In an embodiment, asset transaction data may be obtained from asset custodian data sources 120 in any number of formats including Extensible Markup Language (XML), comma-separated values (CSV), JSON (JavaScript Object Notation), or any other data transfer formats.

Account and asset transaction data may be associated with an individual, a legal entity, or a group of individuals and/or legal entities such as one or more clients of an RIA firm. Transaction object generation unit 110 is configured to transform account and asset transaction data obtained from asset custodian data sources 120 into objects that may be represented as part of graph 102, as further described herein. Graph 102 may represent, in computer memory, elements of and relationships in the assets and transaction data for purposes of efficiently analyzing the assets and transaction data and producing views and analytical reports of the assets and transaction data organized in different ways. Graph 102 may be formed in memory 100 based on data records obtained from data repository 104. Graph 102 may comprise any number of nodes and edges, and the particular graph shown in FIG. 1 is provided solely to illustrate one clear example and not as a requirement or limitation.

Graph 102 may comprise nodes and edges having any level of complexity, and there is no requirement that nodes are organized in a hierarchical arrangement; circular references may be represented. As an example, graph 102 comprises nodes for individuals named Beth and Ken who have an ownership or trusteeship relationship to a Trust. The Trust is related to a company, Alpha Holdings LLC, which is also related to a second company, Beta Holdings LLC that may own a Brokerage Account having a security instrument and other instruments i2, i3. The other instruments may represent stocks, bonds, options, or any other financial instrument that may be traded or receive an investment; for purposes of illustrating a clear example, three instruments are shown in FIG. 1 but practical embodiments may use any number of instruments. Beta LLC further has a relationship to Ken and instrument i1 has a relationship to Beth; these relationships circle back within the graph and provide examples of non-hierarchical node-edge relationships. For example, one circular reference is the path Ken→Trust→Alpha Holdings LLC→Beta Holdings LLC→Ken.

Edge 110 may represent an asset ownership relationship. Edge 110 or other edges may represent other concepts such as a liability relationship, or an equity ownership relationship; thus, one node may represent a security, another node may represent a brokerage account, and an edge connecting the two nodes may represent that the first node owning a number of units of the second node.

Graph nodes may receive data for attributes of the nodes from asset custodian data sources 120, from a global data source, or from other data in the data repository. In an embodiment, financial performance calculation unit 108 is configured to perform financial performance calculations associated with graph 102. In an embodiment, view computation unit 106 is configured to transform the calculations performed by financial performance calculation unit 108 into one or more table views, graphs, charts, and other output, as further described herein.

3.0 Transforming Asset Transaction Data

Figure 1B:
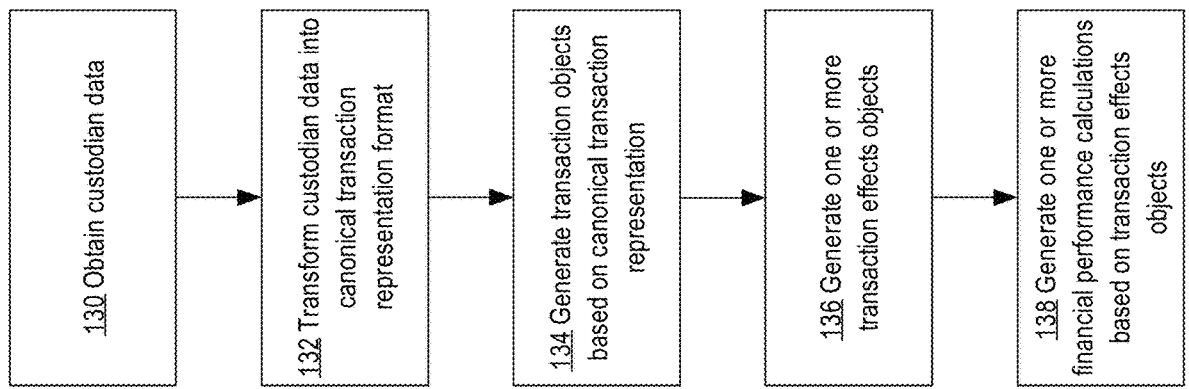
FIG. 1B illustrates a method of transforming asset transaction data obtained from custodian data sources into transaction objects according to an embodiment.

FIG. 1B illustrates a method of transforming asset transaction data obtained from one or more custodian data sources into transaction objects comprising transaction effects, according to an embodiment. At block 130, asset transaction data is obtained from a custodian data source, the obtained data also referred to herein as custodian data. The custodian data includes representations of one or more asset transactions such as, for example, stock purchases, company mergers, stock dividends, or any other type of transaction affecting one or more assets and recorded by a custodian associated with the custodian data source. The asset transactions represented in the custodian data may be identified by one or more transaction type identifiers defined by the particular custodian. In an embodiment, each custodian may define and use a set of transaction type identifiers that may be entirely or partially different from the transaction type identifiers used by other custodians.

At block 132, obtained custodian data is transformed based on a canonical transaction data representation format. In an embodiment, a canonical transaction data representation format defines a representation of custodian data using a single set of transaction type identifiers. The single set of transaction type identifiers is used to uniformly represent financial transactions that may be represented in different ways by various custodians. For example, custodian data may be received from a first brokerage firm in table form and including a representation of a first stock purchase transaction in a single table row and identified by a particular transaction type identifier. Custodian data also may be received from a second brokerage firm that includes a representation of a second stock purchase transaction that is spread across multiple rows and using different transaction type identifiers. In the example, custodian interface unit 112 may transform the custodian data received from each of the first brokerage firm and the second brokerage firm into a canonicalized transaction data representation that uses the same transaction type identifier for representing both stock purchase transactions. As further described herein, the canonical transaction data representation format may be implemented using any number of data representation structures.

At block 134, one or more transaction objects are generated from the canonicalized transaction data representation. In an embodiment, generating transaction objects generally comprises identifying financial transactions included in a canonicalized transaction data representation, and generating and storing one or more transaction objects based on the identified financial transactions. In an embodiment, a transaction object is a programmatic object representing a particular type of financial transaction and generated based on a particular transaction object type definition. In an embodiment, a separate transaction object type definition is created for each transaction object type of a set of system-defined transaction object types. For example, a stock dividend transaction identified in a canonicalized transaction data representation may cause transaction object generation unit 110 to generate a transaction object based on a transaction object type definition that represents dividend transactions; similarly, an identified stock redemption transaction may cause generating a transaction object based on a transaction object type definition that represents stock redemptions. Each generated transaction object includes metadata specifying a type of transaction represented by the transaction object, graph nodes associated with the transaction, and other information, as further described herein.

In an embodiment, the system-defined transaction object types represent a single set of transaction types that may be used to represent transactions identified in custodian data obtained from any number of asset custodian data sources 120. In one embodiment, the system-defined transaction object types may correspond to the transaction types defined by the canonical transaction data representation format, as described above. In this manner, the type of transaction object generated for each transaction identified in a canonicalized transaction data representation may be based directly on the transaction type identifier in the canonicalized transaction data representation.

At block 136, generation of transaction objects further includes generating one or more transaction effects objects. In an embodiment, transaction effects objects are programmatic objects that represent particular accounting events associated with a financial transaction. In an embodiment, each transaction object type definition includes specification of one or more particular transaction effects that represent the accounting events associated with the transaction object type. In this context, an accounting event generally refers to the debiting or crediting of a particular accounting account, for example, similar to manner in which financial transactions may be recorded in a double-entry bookkeeping system. The term "accounting accounts" is used herein to distinguish such accounts, maintained in an accounting computer system, from financial institution accounts that actually hold funds, assets or instruments at custodians or other financial entities. In an embodiment, each edge in the financial graph is associated with a plurality of accounting accounts against which credits and debits represented by transaction effects objects may be applied. In an embodiment, a transaction effect object represents the most fine-grained or atomic element in the financial analysis system.

In an embodiment, the accounting events represented by transaction effect objects associated with a particular transaction object may collectively conform to the accounting equality of debit and credit transactions across all accounting accounts specified by the transaction effect objects. In other words, for a particular transaction object, the sum of the values specified by one or more associated transaction effect objects representing debits generally equals the sum of the values specified by one or more associated transaction effect objects representing credits. The accounting equality may be used, for example, to check for potential errors in received custodian data and in other data consistency checks.

At block 138, one or more financial performance calculations are generated based on one or more stored transaction effects objects. For example, financial performance calculation unit 108 may perform one or more financial performance calculations in response to a user request for a particular financial report involving one or more nodes in graph 102. Financial performance calculations may include calculations such as, for example, total asset returns, internal rates of return, and dividend yields. Financial performance calculations may also refer to the generation of entire reports that involve many assets including, for example, income statements, balance sheets, and cash flow statements. View computation unit 106 may generate reports and other displays based on requested financial performance calculations that may be displayed to a user in any number of formats. The calculation of financial performance calculations based on transaction effects objects provides for a number of efficiencies, as further described herein.

3.1 Canonical Transation Data Representation Format

Figure 2:
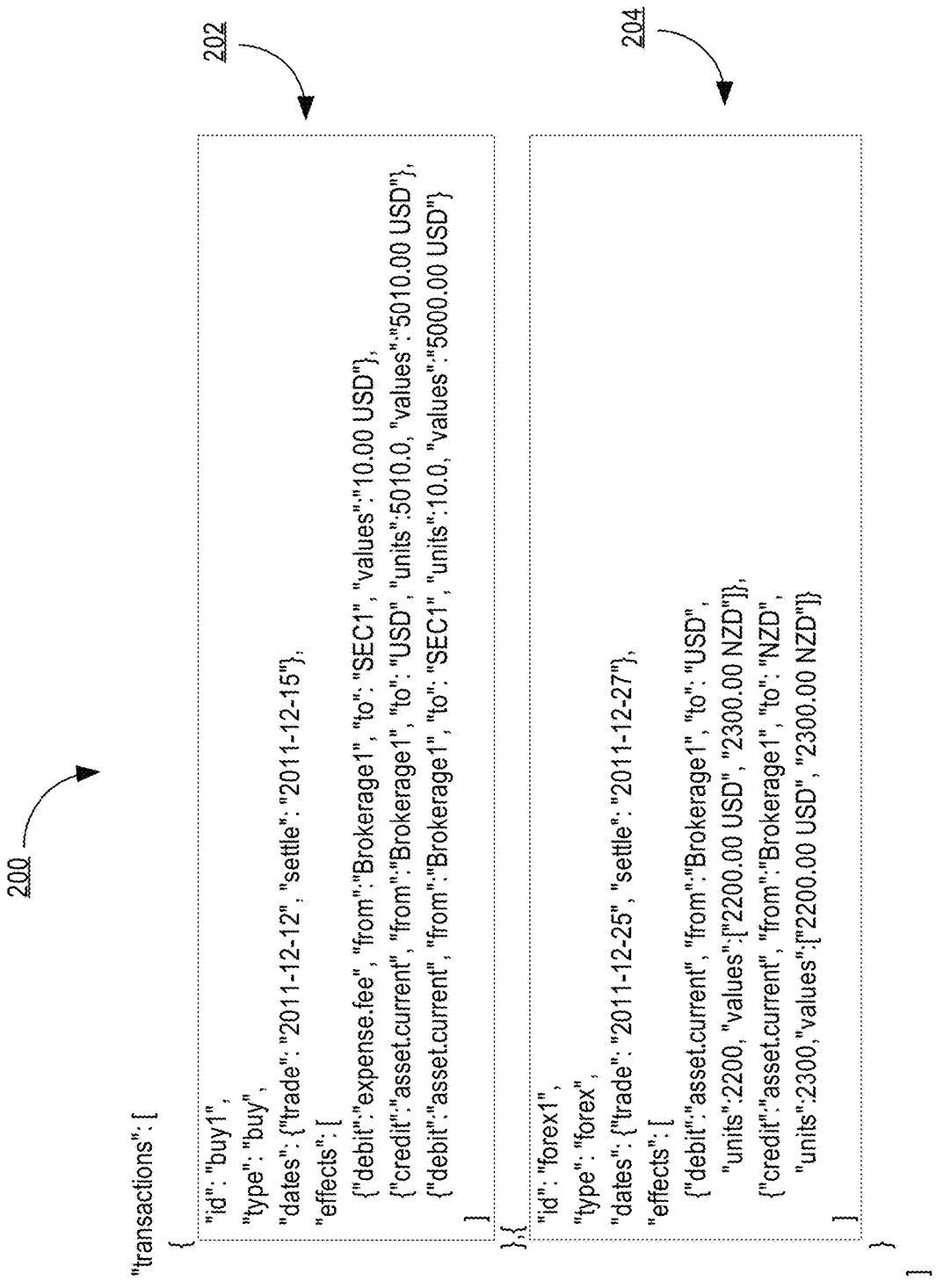
FIG. 2 illustrates an example representation of obtained asset transaction data in a canonical transaction representation format.

In an embodiment, custodian interface unit 112 obtains custodian data from asset custodian data sources 120 and transforms the custodian data into a canonicalized transaction data representation. FIG. 2 illustrates an example representation 200 of obtained custodian data based on a canonical transaction data representation format. Representation 200 includes two transactions 202, 204 that may have been identified in asset transaction data obtained from custodian data sources. For example, transaction 202 may represent a stock purchase transaction and includes a transaction identification string ("buy1"), a transaction type identifier ("buy"), dates associated with the transaction ("trade": "2011-12-12", "settle": "2011-12-15"), and three lines representing transaction effects in the brackets labeled "effects."

In an embodiment, transaction 202 may have been generated, for example, in response to custodian interface unit 112 identifying a stock purchase transaction recorded in asset transaction data obtained from asset custodian data sources 120. In an embodiment, custodian interface unit 112 provides a mapping from the representation of various transactions identified in obtained asset transaction data into a canonical transaction data representation format, such as the example representation illustrated in FIG. 2. In an embodiment, the process of identifying particular transactions in asset transaction data obtained from asset custodian data sources 120 and mapping those transactions to a canonical transaction data representation may be particular to each individual asset custodian and obtained asset transaction data format. The particular approach for identifying transactions in asset transaction data and mapping them to a canonical transaction data representation is not critical.

Transaction 204 includes information that may represent an identified foreign exchange transaction. For example, transaction 204 includes a transaction identification string ("forex1"), a transaction type identifier ("forex"), dates associated with the transaction ("trade": "2011-12-25", "settle": "2011-12-27"), and two transaction effects.

For the purposes of illustrating a clear example, the canonical transaction data representation 200 illustrates two transactions; in other embodiments, a canonical transaction data representation may include any number of transactions identified in custodian data. Further, the particular format of canonical transaction data representation 200 is only one example representation format, and any transaction representation may be used, such as XML, CSV, JSON, or any other data encoding formats. In still other embodiments, asset transaction data may be directly transformed into transaction data objects without conversion into a canonical transaction data representation format. In one embodiment, a canonical transaction data representation such as representation 200 may be stored by custodian interface unit 112 in one or more files for use by other system components.

3.2 Generating Transaction Objects

In an embodiment, in response to custodian interface unit 112 obtaining custodian data from asset custodian data sources 120, transaction object generation unit 110 generates one or more transaction objects, including creating and storing the transaction objects in computer memory. In an embodiment, generating transaction objects generally comprises instantiating one more or programmatic objects based on transactions identified in a canonicalized transaction data representation generated by custodian interface unit 112 for storage in data repository 104 and/or representation in graph 102 in memory for further use, reference, and manipulation.

In an embodiment, in response to identifying a particular transaction, transaction object generation unit 110 generates a transaction object based on a transaction object type definition from a plurality of transaction object type definitions in the system. FIG. 3 illustrates example program code 300 that illustrates a transaction object type definition that may be used to generate a transaction object of a particular transaction type. In program code 300, for example, the syntax Tx("buy") in code segment 302 may indicate that the program code represents specification of a transaction object type representing purchases of a security. For example, program code 300 may be used to generate a transaction object based on the stock purchase information included in transaction 202 in canonical transaction data representation 200. In an embodiment, similar program code specifying a different transaction object type definition may be used to generate a transaction object representing foreign exchange transactions based on the foreign exchange information included in transaction 204, and so forth.

Code segments 302, 304 illustrate program code specifying various metadata and transaction effect object definitions associated with a transaction object generated based on program code 300. For example, code segment 302 illustrates the specification of particular nodes related to a security purchase transaction, including a node representing an owner of the purchased securities ("o"), a node representing the cash account used to purchase the securities ("co"), a node representing the type of currency used in the transaction ("c"), and a node representing the purchased security ("sec"). In an embodiment, data values representing the actual nodes associated with a particular transaction may be supplied as parameters when the transaction object is generated.

In an embodiment, generated transaction objects may be stored in a data repository 104 for later retrieval. For example, transaction objects may be serialized and stored in a column in a database. Storage of the generated transaction objects enables later retrieval of the transaction objects and associated transaction effects objects for the purposes of analysis, generating reports, and other financial performance metrics as further described herein.

3.3 Transaction Effects

In an embodiment, program code defining a particular transaction object type specifies a set of transaction effect definitions that correspond to the particular transaction object type and that enable generating transaction effect objects. Code segment 304 illustrates program code specifying three transaction effect definitions for a security purchase transaction object type. The transaction effect definitions included in code segment 304 generally correspond to the accounting events resulting from following components of a security purchase transaction: (1) a transfer of the purchased securities into a brokerage account; (2) the levying of a brokerage fee associated with the purchase of the securities; and (3) a transfer of cash from an account to pay for the securities and brokerage fee. In an embodiment, transaction effect definitions for other transaction object types may differ depending on the particular nature of the transaction type.

Figure 4:
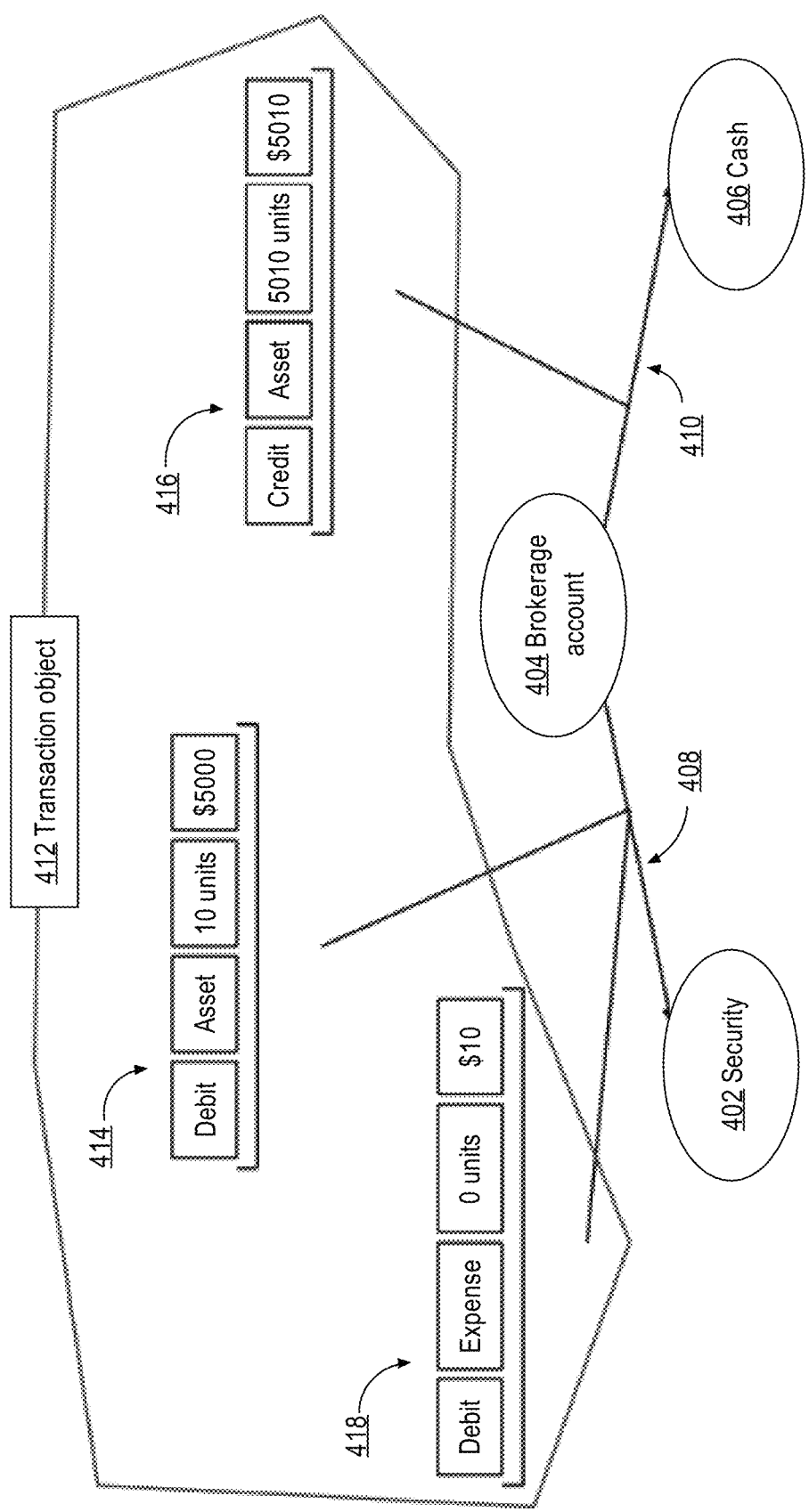
FIG. 4 illustrates a relationship between transaction effect objects and edges of a financial graph.

FIG. 4 illustrates a representation of a generated transaction object and associated transaction effect objects in relation to a segment of a financial graph. For example, transaction object 412 may have been generated based on program code such as program code 300. In FIG. 4, a graph segment is composed of nodes 402, 404, 406 and edges 408, 410. Node 402 may represent a security such as, for example, an equity security, debt security, or other similar financial instrument. Edges 408, 410 represent a relationship between the connected nodes. For example, edge 408 may represent a commitment by brokerage account (node 404) to purchase one or more units of a security (node 402). The graph segment illustrated in FIG. 4 may be part of a larger financial graph, such as graph 102, and may include any number of nodes and edges; the illustrated graph segment is used only for the purposes of illustrating a clear example.

In an embodiment, transaction object 412 represents a purchase of a number of units of a security (node 402) facilitated by brokerage account (node 404) using an amount of cash (node 406) associated with the brokerage account. For example, assuming node 402 represents stock in a particular company, transaction object 412 may have been generated as a result of a user interacting with the user's online brokerage account and instructing the purchase of ten shares of the stock represented by node 402 at $500 per share. In the example, the brokerage associated with node 404 additionally charges a $10 fee to facilitate the purchase.

Transaction object 412 comprises three transaction effect objects 414, 416, 418. In an embodiment, each of transaction effect objects 414, 416, 418 comprises values associated with the accounting event represented by the particular transaction effect object. As described above, the values generally indicate a debit or credit applied to a particular accounting account associated with a specified edge in a financial graph. In an embodiment, a separate set of data values representing a plurality of accounting accounts are stored in association with each of edges 408, 410. For example, edge 408 may be associated with data values representing each of an assets account, a liabilities account, an equity account, an income account, an expenses account, and one or more sub-accounts.

Transaction effect object 414 represents an accounting event associated with a transfer of ten shares of the purchased stock (node 402) into a brokerage account (node 404). In the example of FIG. 4, transaction effect object 414 is associated with the edge connecting node 402 and node 404 because the accounting event represented by transaction effect object 414 is related to both nodes. In general, a particular transaction effect object is associated with a particular edge in a financial graph connecting the nodes most relevant to the accounting event represented by the transaction effect object. Thus, each transaction effect object essentially represents, in a way that is more efficient for other computing processes and the general operation of the server computer, an effect upon nodes in the graph of a particular transaction, as represented in a transaction object and ultimately in the transaction data obtained from a custodian.

According to financial accounting conventions, receiving a number of shares of a security represents an increase to an asset accounting account, and an increase to an asset accounting account is a represented by a debit. Thus, in the example, transaction effect object 414 is specified as a debit transaction. Transaction effect object 414 further specifies that 10 units of the security are transferred and that the value of the increase to the assets accounting account is an amount of $5000.

Transaction effect object 418 represents the accounting event corresponding to a payment of a $10 brokerage fee for the transaction. According to financial accounting conventions, payment of a fee is represented as a debit to an expenses accounting account. Thus, transaction effect object 418 is specified as a debit transaction associated with edge 408. Transaction effect object 416 represents an accounting event corresponding to a transfer of cash to pay for the security shares and the brokerage fee and is represented as a credit to the asset account associated with edge 410. In the example, the sum of the transaction effect object debits ($5000+$10) is equal to the sum of the transaction effect objects credits ($5010).

Figure 5:
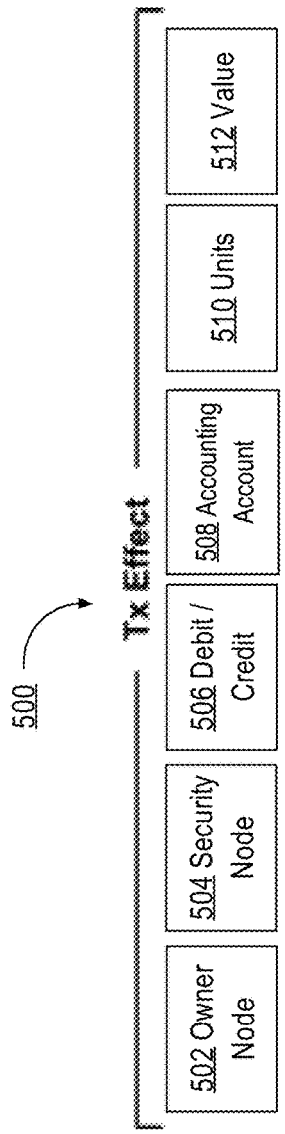
FIG. 5 illustrates example components of a transaction effect object.

FIG. 5 illustrates example components of a transaction effect object. In an embodiment, a transaction effect object may specify an owner node 502, a security node 504, an indication that the transaction effect represents a debit or a credit 506, an accounting account 508, a number of units 510, and a value 512. In other embodiments, transaction effect objects may specify more or fewer components.

In one embodiment, a transaction effect object is associated with a particular edge in a financial graph by specifying a pair of nodes in the graph that the particular edge connects, referred to in FIG. 5 as an owner node and a security node. In general, an owner node 502 corresponds to a node in the financial graph representing an individual, legal entity, or financial account relative to which the associated accounting event occurred. Similarly, a security node 504 may represent a particular security or other asset associated with as accounting event, for example, an equity security, a cash account, a bond, or any other financial instrument. Each of the owner node 502 and security node 504 may be supplied as parameters to program code generating the transaction effect, as described above in relation to FIG. 2.

In an embodiment, a transaction effect object specifies that the associated accounting event represents either a debit or a credit 506. As described above, the specification of a particular accounting event as either a debit or credit generally corresponds to financial accounting conventions. In an embodiment, a transaction effect object specifies an accounting account 508 against which the corresponding debit or credit is recorded. As described above, the specification of a debit or credit 506 and a particular accounting account 508 generally may conform to financial accounting conventions.

In an embodiment, a transaction effect object optionally specifies a value 512 representing a number of units representing the change to an asset position. For example, a transaction effect object associated with a stock purchase transaction object may specify a numerical value representing an increase in the number of shares of the stock. As another example, a transaction effect associated with a stock dividend that does not affect the ownership of the stock may not specify a units 510 value.

In an embodiment, a transaction effect object may optionally specify a value 512 representing the magnitude of an income or an expense occurring relative to the associated financial position. For example, a value 512 may reflect the value of stock shares obtained in a stock purchase transaction, or the value of an amount of currency received in a foreign exchange transaction.

In an embodiment, a transaction effect object may store a set of values 512, with each value in the set representing a different currency. Storing a collection of values in various currencies enables reconciliation and other reports to be done more efficiently in multiple currencies. For example, referring again to FIG. 2, transaction 204 may represent a foreign exchange transaction of United States dollars for New Zealand dollars. In the example, the canonical transaction representation includes the syntax "values": ["2200.00 USD", "2300.00 NZD"], the syntax representing the specification of a single value as valued in multiple currencies. In this manner, financial calculations may be more readily produced in each of the stored currencies without performing currency conversion calculations.

4.0 Generating Performance Calculations

In an embodiment, the financial analysis system provides for the implementation of various financial performance calculations for the purposes of analyzing and reporting on obtained financial transaction data. For example, financial performance calculations may include calculations involving one or more assets in a financial graph such as, for example, total asset returns, internal rates of return, and dividend yields. Financial performance calculations may also refer to the generation of entire reports that involve many assets such, for example, income statements, balance sheets, and cash flow statements. Financial performance calculations may be requested by users on various parts of a financial graph, and the resulting reports may be displayed to the user in any number of formats.

In an embodiment, financial performance calculations may be defined in terms of transaction effects. In other words, financial performance calculations implemented by the financial analysis system may be calculated based on values contained in individual transaction effect objects, and not based on the composite transaction objects comprising the transaction effect objects. For example, in order to perform a calculation of the internal rate of return for a particular asset, rather than taking into account each of the high-level transaction objects associated with the asset and the transaction types corresponding to those objects, the calculation may be performed by analyzing the stored transaction effect objects associated with edges in the graph connecting the node representing the asset. In this manner, financial performance calculation implementations may be independent of the addition, removal, or modifications of particular transaction object types. Similarly, transaction object types may be added, removed, or modified in the system without change to the financial performance calculations.

Figure 6:
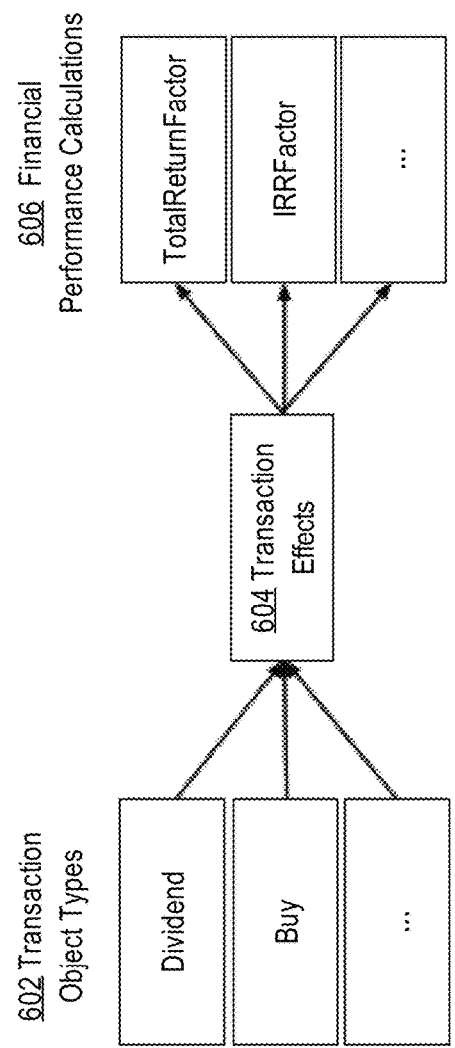
FIG. 6 illustrates a relationship between transaction object types, transaction effects, and financial performance calculations.

FIG. 6 illustrates a relationship between transaction object types, transaction effects, and financial performance calculations. Referring to FIG. 6, transaction objects types 602 represent a collection of transaction object types defined by the financial analysis system. As described above, the collection of transaction types generally represent the set of represented financial transactions and may include, for example, stock purchases, dividends, foreign exchange transactions, and any other defined transaction type. Transaction effects 604 represent the set of transaction effects defined as part of transaction object types 602 and that serve as the basis for generated transaction effect objects. As described above, in an embodiment, each of the transaction object types 602 is defined in terms of similarly structured transaction effect definitions and the resulting transaction effect objects may be referenced separately from the containing transaction objects.

In an embodiment, financial performance calculations 606 represent a set of financial performance calculations defined by the system. The arrangement of FIG. 6 provides an illustration of the abstraction layer transaction effects provide between the transaction object types 602 and financial performance calculations 606, enabling modifications to be made to either transaction object types 602 or financial performance calculations 606 without directly affecting the other.

In an embodiment, some financial performance calculations may take into account transaction object types associated with transaction effects. For example, a calculation for dividend yield may be implemented by retrieving transaction objects representing dividend transactions and not transaction objects associated with other transaction types. In this manner, the dividend yield calculation is calculated based on transaction effects associated with dividend transaction objects, and not on transaction effects associated with unrelated types of transactions.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
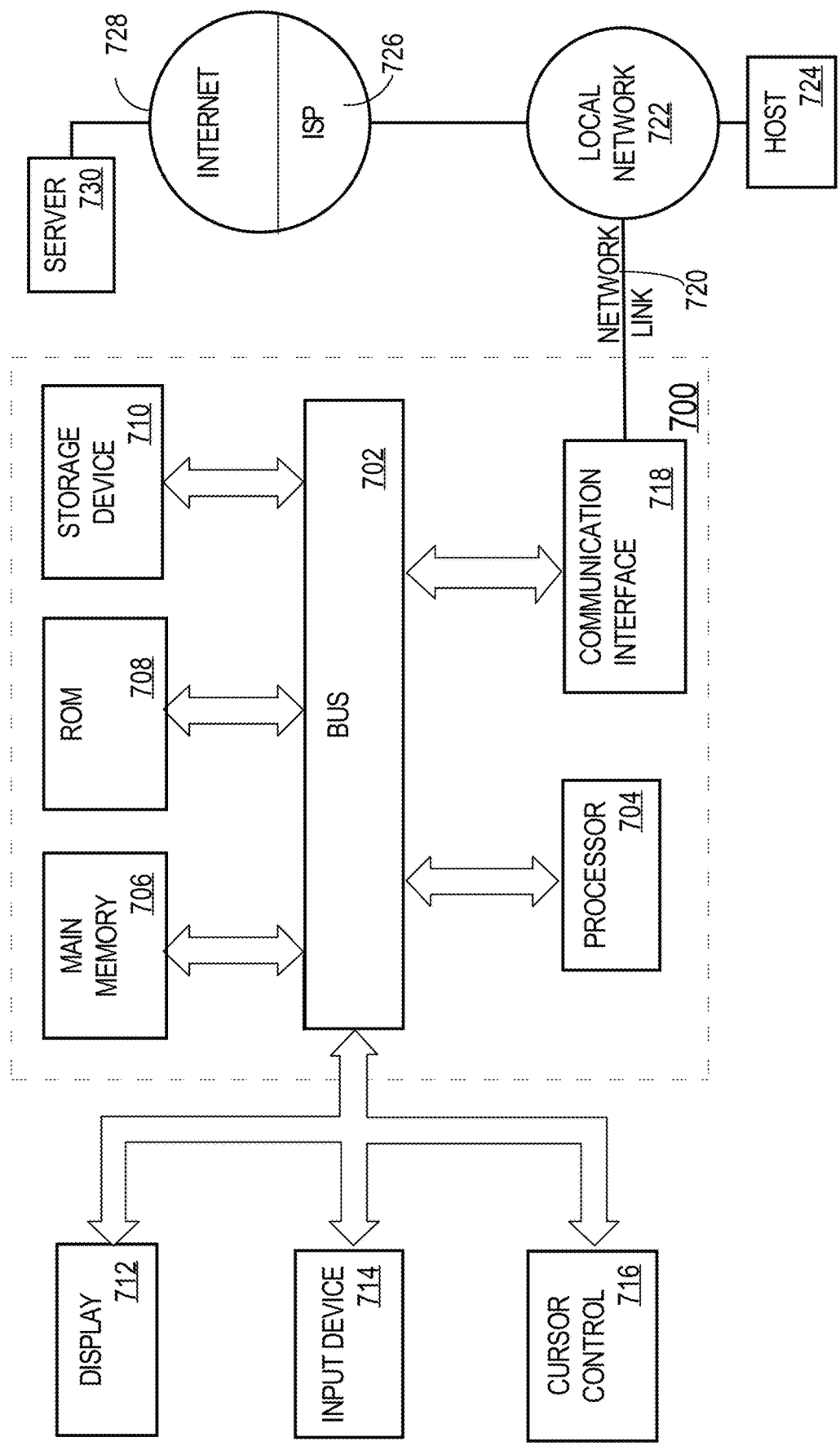
FIG. 7 illustrates a computer system with which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    by one or more hardware computer processors configured with specific computer executable instructions:
        receiving, from a custodian or other data source via a custodian client interface, information associated with a transaction data item related to an accounting;
        determining, based on the received information, one or more transaction effects of the transaction data item;
        generating one or more transaction effect objects based on the determined one or more transaction effects, each of the one or more transaction effect objects comprising at least one of the determined one or more transaction effects;
        determining, for each of the one or more transaction effect objects, a respective edge of a mathematical graph associated with the transaction effect object, the mathematical graph comprising a plurality of nodes and a plurality of edges;
        associating each of the transaction effect objects with the respective determined edges of the mathematical graph, wherein each respective determined edge of the mathematical graph stores a relationship between at least two nodes of the plurality of nodes; and
        calculating a performance calculation by reference to at least one transaction effect object.

2. The computer-implemented method of claim 1, further comprising:
    determining a type of the performance calculation to calculate; and
    determining, by reference to the mathematical graph and based on the type of the performance calculation, at least one transaction effect object needed to calculate the performance calculation.

3. The computer-implemented method of claim 1 further comprising:
    by the one or more hardware computer processors:
        receiving, via a graphical user interface, a user input comprising an indication of the performance calculation.

4. The computer-implemented method of claim 3 further comprising:
    by the one or more hardware computer processors:
        generating and displaying a report comprising the calculated performance calculation.

5. The computer-implemented method of claim 1, wherein at least some of the plurality of edges represent at least one of: an asset ownership, a liability, an equity ownership, or a commitment for transaction.

6. The computer-implemented method of claim 1, wherein the associating and calculating are performed without displaying the mathematical graph to a user.

7. The computer-implemented method of claim 1, wherein at least some of the plurality of transaction effect objects include an indication of a value associated with the transaction data item.

8. The computer-implemented method of claim 1, wherein each of the transaction effect objects is associated with respective sets of properties including at least one of: an indication of an owner, an indication of a security type, an indication of a number of units, an indication of a value, or an indication of an account.

9. The computer-implemented method of claim 1, wherein each of the plurality of transaction effect objects for the transaction data item comprises indications of an owner node and a security node.

10. The computer-implemented method of claim 1, wherein at least one of the plurality of transaction effect objects for the transaction data item comprises an indication of an account.

11. The computer-implemented method of claim 1, wherein the respective determined edges of the mathematical graph represents at least one of an asset ownership, a liability, or an equity ownership.

12. The computer-implemented method of claim 1, wherein the mathematical graph comprises a non-displayed graph.

13. The computer-implemented method of claim 1, wherein each of the plurality of transaction effect objects further comprises indications of a plurality of values, each of the plurality of values representing a different currency.

14. The computer-implemented method of claim 13, wherein calculating the performance calculation further comprises referencing one of the plurality of values indicated by each of the plurality of transaction effect objects.

15. A computer system comprising:
- a non-transitory computer readable medium storing computer executable instructions;
- a custodian client interface configured to receive information associated with a transaction data item; and
- one or more hardware processors in communication with the computer readable medium, and configured to execute the computer executable instructions to cause the computer system to:
  - receive, from a custodian data source or other data source via the custodian client interface, the information associated with the transaction data item;
  - determine, based on the received information, one or more transaction effects of the transaction data item;
  - generate one or more transaction effect objects based on the determined one or more transaction effects, each of the one or more transaction effect objects comprising at least one of the determined one or more transaction effects;
  - determine, for each of the one or more transaction effect objects, a respective edge of a mathematical graph associated with the transaction effect object, the mathematical graph comprising a plurality of nodes and a plurality of edges;
  - associate each of the transaction effect objects with the respective determined edges of the mathematical graph, wherein each respective determined edge of the mathematical graph stores a relationship between at least two nodes of the plurality of nodes; and
  - calculate a performance calculation by reference to at least one transaction effect object.

16. The computer system of claim 15, wherein the one or more hardware processors are configured to execute the computer executable instructions to further cause the computer system to:
- receive, via a graphical user interface, a user input comprising an indication of the performance calculation.

17. The computer system of claim 15, wherein the one or more hardware processors are configured to execute the computer executable instructions to further cause the computer system to:
- generate and display a report comprising the calculated performance calculation.

18. The computer system of claim 15, wherein each of the plurality of transaction effect objects further comprises indications of a plurality of values, each of the plurality of values representing a different currency.

19. The computer system of claim 18, wherein the one or more hardware processors are configured to execute the computer executable instructions to further cause the computer system to:
- reference one of the plurality of values indicated by each of the plurality of transaction effect objects.

20. The computer system of claim 18, wherein at least some of the plurality of edges represent at least one of: an asset ownership, a liability, an equity ownership, or a commitment for transaction.

* * * * *